United States Patent
Merrill et al.

(10) Patent No.: US 6,993,602 B2
(45) Date of Patent: Jan. 31, 2006

(54) CONFIGURING QUEUES BASED ON A GIVEN PARAMETER

(75) Inventors: George P. Merrill, Auburn, NH (US); Steven W. Zagorianakos, Brookline, NH (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/060,865

(22) Filed: Jan. 29, 2002

(65) Prior Publication Data

US 2003/0154353 A1 Aug. 14, 2003

(51) Int. Cl.
*G06F 13/14* (2006.01)

(52) U.S. Cl. .............................. 710/54; 710/57; 709/209
(58) Field of Classification Search ............... 709/209, 709/210; 710/54, 52, 53, 57
See application file for complete search history.

(56) References Cited

U.S. PATENT DOCUMENTS 6,279,087 B1 * 8/2001 Melo et al. ................. 711/146
6,359,901 B1 * 3/2002 Todd et al. ................. 370/465

FOREIGN PATENT DOCUMENTS

EP                342107 A2 * 11/1989
WO           WO95/18415         7/1995

OTHER PUBLICATIONS

Parker, et al., "Hardware/Software Tradeoffs in a Variable Word Width, Variable Queue Length Buffer Memory", *Proceedings of the 4th Annual Symposium on Computer Architecture*, Mar. 1977, pp. 159–164.

* cited by examiner

*Primary Examiner*—B. James Peikari
(74) *Attorney, Agent, or Firm*—Fish & Richardson P.C.

(57) ABSTRACT

At least one queue parameter for a first process running on a system is determined. A queue management process separate from the first process configures one or more queues on a storage device in accordance with the at least one queue parameter.

39 Claims, 4 Drawing Sheets

CONFIGURING QUEUES BASED ON A GIVEN PARAMETER

TECHNICAL FIELD

This invention relates to queue management.

BACKGROUND

Queues in computer systems are general communication mechanisms that are used by the computer programs operating on the computer system to temporarily store queued objects (e.g., data packets, commands, pointers, messages, and so forth). For example, a database program may be receiving streaming data from a data input port on a computer system. This data, upon receipt from the data input port, is temporarily stored in a queue and subsequently processed when the processor executing the database program become available.

Queues are typically "hardwired" in that they are configured in system hardware and, therefore, do not adapt to the applications running on the computer system.

DETAILED DESCRIPTION

Figure 1:
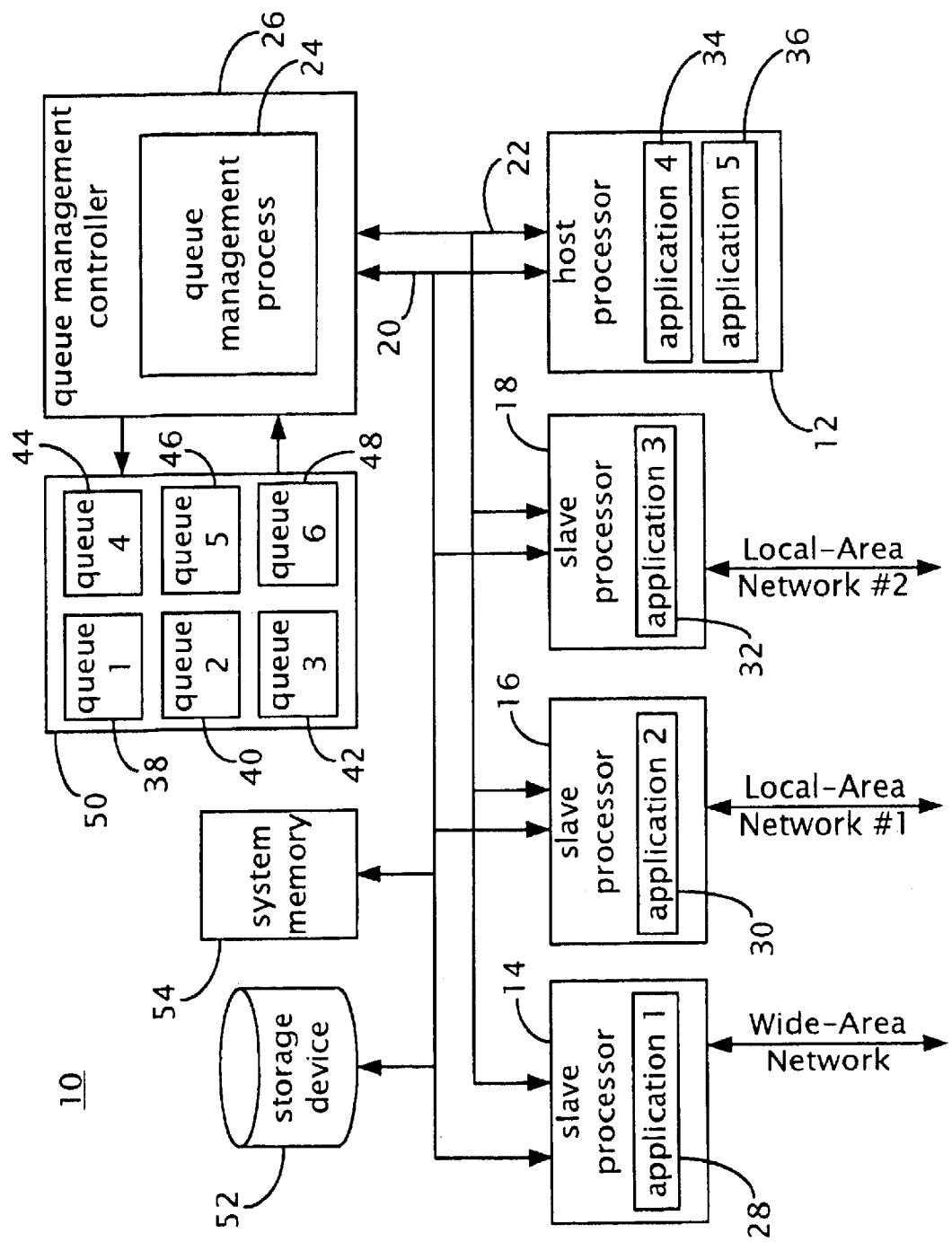
FIG. 1 shows a system incorporating a queue management process.

As shown in FIG. 1, system 10 includes a host processor 12 interconnected with three slave processors 14, 16, and 18 by a data bus 20 and a flag bus 22. A queue management process 24 operates on a queue management controller 26.

Processors 12, 14, 16, and 18 execute applications that process data and control its flow between these processors and other external devices. Upon system startup, queue management process 24, through host processor 12, monitors the applications 28, 30, 32, 34 and 36 that are running on the processors 12, 14, 16 and 18 to determine the queuing requirements of each application. Once these requirements are determined, queue management process 24 configures the queues 38, 40, 42, 44, 46 and 48 required by these applications in accordance with their individual needs and specifications. Therefore, the queues available to the applications running on the processors are dynamically configured, each time system 10 is started, based on the specific needs of the application(s) using that queue. These queues are configured on an eight kilobyte SRAM (static random access memory) storage device 50.

Typically, slave processors 14, 16 and 18 are programmable state machines that control the flow of data retrieved from a data port or bus. For example, slave processor 14 may control the transmission and retrieval of data on a WAN (wide-area network) and slave processors 16 and 18 may control the transmission and retrieval of data on LANs (local-area networks), such as 10BaseT and 100BaseTx Ethernet networks.

When system 10 is initially started, host processor 12 determines the queue parameters of each queue required by each application running on system 10. Therefore, if ten applications are running on system 10 and each application requires three queues, host processor 10 will determine the queue parameters for thirty queues. These queue parameters, which are provided by each of these applications, include a queue depth parameter that specifies the required depth of the queue (in words), and a queue entry size parameter that specifies the required entry size of the queue (in words).

If more than one queue is required for an application, multiple sets of queue parameters are provided by the application requiring multiple queues. Assume that, for example, five applications 28, 30, 32, 34 and 36 are running on system 10 at startup, and four of these applications 28, 30, 32 and 34 require one queue each (e.g., queues 38, 40, 42 and 44 respectively) and the fifth application 36 requires two queues (e.g., queues 46 and 48). These queues are created and configured based on the queue parameters provided by each application, such that the fifth application 36 provides two sets of queue parameters, a first set for queue 46 and a second set for queue 48.

Figure 2:
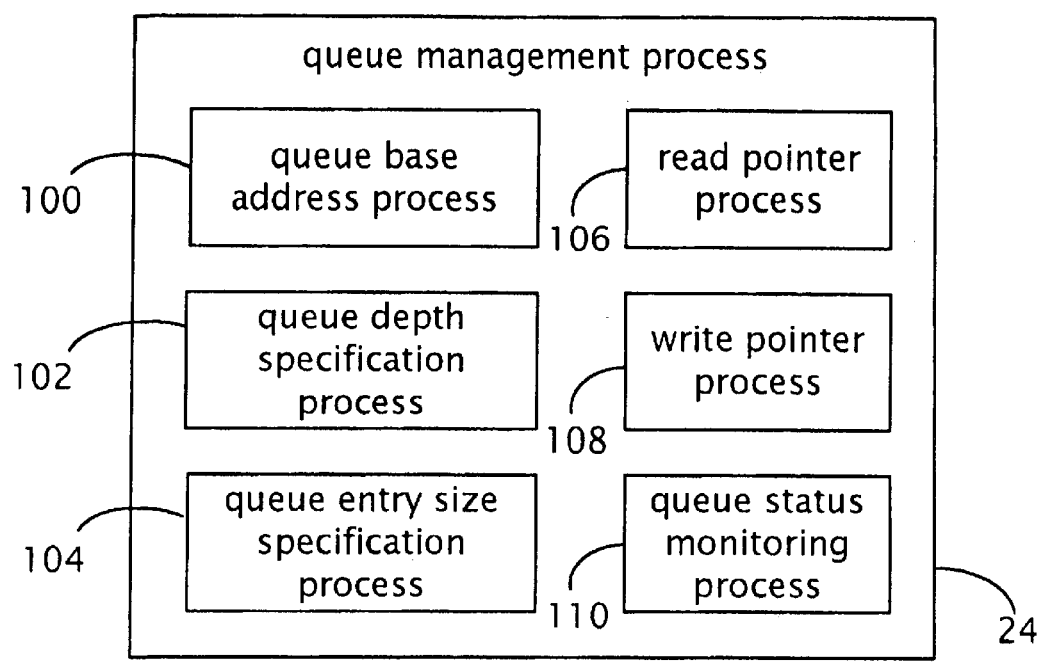
FIG. 2 shows a detailed view of the queue management process.

Referring also to FIG. 2, queue management process 24 includes a queue base address process 100 for specifying a starting memory address for each queue to be configured by queue management process 24. Since the queues are all configured dynamically in a common memory storage device 50, each queue needs a unique starting address, such that the starting memory address in combination with the depth of the queue (i.e., that queue's buffer size or storage capacity) maps the memory address space of that queue.

Queue management process 24 also includes a queue depth specification process 102 that works in conjunction with queue base address process 100 to specify the memory address space of the queue. Each of these queues is typically configured to have a depth (i.e., a buffer size) of sixteen words, thirty-two words, sixty-four words, or one-hundred-twenty-eight words. These words are queue objects that may be, for example, system commands or chunks of data provided by an application running on system 10.

In the example, queue management process 24 configures six queues 38, 40, 42, 44, 46 and 48 for the five applications 28, 30, 32, 34 and 36 running on system 10. Let's assume that system 10 is a thirty-two bit system in which each word is a four byte word. Further, assume that the queue parameters for each of these queues specify the following queue depths:

| queue | depth (in words) |
|---|---|
| 1 | 16 |
| 2 | 16 |
| 3 | 32 |
| 4 | 32 |
| 5 | 16 |
| 6 | 64 |

Since in this example the storage device 50 is eight-kilobytes of SRAM, the available memory address space of the storage device is 0000-1FFFH. Queue base address process 100 assigns the first queue an arbitrary starting address (e.g., 0000H) and, since this queue has a depth of sixteen four-byte words, the address space of this first queue is 0000H to 003FH, for a total of sixty-four bytes. The following chart shows the address space for queues one through six:

| queue | depth | starting address | ending address | memory space | size (in bytes) |
|---|---|---|---|---|---|
| 1 | 16 | 0000H | 003FH | 0000-003FH | 64 |
| 2 | 16 | 0040H | 007FH | 0040-007FH | 64 |
| 3 | 32 | 0080H | 00FFH | 0080-00FFH | 128 |
| 4 | 32 | 0100H | 017FH | 0100-017FH | 128 |
| 5 | 16 | 0180H | 01BFH | 0180-01BFH | 64 |
| 6 | 64 | 01C0H | 02BFH | 01C0-02BFH | 256 |

Queue management process 24 includes a query entry size specification process 104 that defines the entry size of each queue 38, 40, 42, 44, 46 and 48. The queue entry size parameter specifies the entry size (in words) of that queue and defines how often the status of the queue is transmitted on flag bus 22 to processors 12, 14, 16 and 18 (to be discussed below is greater detail). Each queue is typically configured to have an entry size of either one, two, or four words.

During operation of system 10, queues 38, 40, 42, 44, 46 and 48 function as buffers that temporarily store queue objects before they are processed by their intended recipient. For example, assume that slave processor 14 controls the transmission and retrieval of data on a WAN. Application 28, which is running on processor 14, transfers this data, through data bus 20, to host processor 12 for storage. Application 34, which is running on host processor 12, attends to storing this data on storage device 52 (e.g., a hard disk drive). When application 28 transfers the data to host processor 12, commands are included that specify that the data is to be stored by the host processor. These pieces of data and the storage commands all constitute queue objects that, in this example, are transferred, through data bus 20, to host processor 12 for processing. These queue objects may be a one word command sent to host processor 12 followed by a one word data packet, such that the one word command instructs host processor 12 (and application 34) to store the data packet that follows the one word command on storage device 52.

Upon the startup of system 10, queue management process 24 configures, on storage device 50, the queues required for applications 28 and 34 based on the queue parameters provided by these applications. Once this queue configuration is complete, slave processor 14 (via application 28) starts transferring data packets and commands (i.e., queue objects) to host processor 12 for storing on storage device 52 via application 34.

These data packets and commands are temporarily stored on the queue associated with application 34 (i.e., queue 44) so that the commands can be processed and the data packets stored whenever host processor 12 becomes available.

Typically, queues 38, 40, 42, 44, 46 and 48 are FIFO (First-In, First-Out) queues, in which the first queue object stored in the queue is the first queue object processed by the application/processor when available. Accordingly, queue management process 24 includes both a read pointer process 106 and a write pointer process 108 for each queue created.

Read pointer process 106 specifies the address in memory (i.e., the next read address) from which the next queue object requested from the queue is to be read. Write pointer process 108 specifies the address in memory (i.e., the next write address) to which the next queue object provided to the queue is to be written. The operation of read and write pointer processes 106 and 108 are best described by example. Assume queue 44 (i.e., the queue associated with application 34) is empty and, therefore, the write pointer process 108 specifies the next write address as 0100H (i.e., the starting address of queue 44). The next read address is undefined, as the queue is empty.

If slave processor 14, via application 28, provides host processor 12 with four data packets for storing on storage device 52, these data packets and the storage commands (i.e., the queue objects) are temporarily stored on queue 44 until host processor 12 is ready to process them.

Once these four data packets and their respective storage commands are written to queue 44, the content of queue 44 is as follows:

| word # | address | content |
|---|---|---|
| 01 | 0100H | storage command 1 |
| 02 | 0104H | data packet 1 |
| 03 | 0108H | storage command 2 |
| 04 | 010CH | data packet 2 |
| 05 | 0110H | storage command 3 |
| 06 | 0114H | data packet 3 |
| 07 | 0118H | storage command 4 |
| 08 | 011CH | data packet 4 |
| 09 | 0120H | -empty- |
| 10 | 0124H | -empty- |
| 11 | 0128H | -empty- |
| ... | ... | ... |
| 32 | 017C | -empty- |

Since the eight queue objects (four data packets and four storage commands) are currently stored in queue 44, the next available address for writing a queue object is the address of "word 09", namely 0120H. Accordingly, write pointer process 108 will specify 0120H as the next write address. Further, since the first queue object received (i.e., "storage command 1") is still awaiting processing by host processor 12, the next read address, as specified by read pointer process 106, is 0100H. If host processor 12 becomes available for a short period of time and is able to process "storage command 1" and "storage command 2", "data packet 1" and "data packet 2" will be stored on storage device 52.

Accordingly, since the first four queue objects (i.e., words 1–4) were read from queue 44, the address of the next queue object to be read from queue 44 is 0110H (the address of "word 05"). The next read address, as specified by read pointer process 106, is 0110H. However, since no additional queue objects were written to queue 44, the next write address is still 0120H. If a fifth storage command and data packet are written to queue 44, the content of queue 44 will be as follows:

| word # | address | content |
|---|---|---|
| 01 | 0100H | |
| 02 | 0104H | |
| 03 | 0108H | |
| 04 | 010CH | |
| 05 | 0110H | storage command 3 |
| 06 | 0114H | data packet 3 |
| 07 | 0118H | storage command 4 |
| 08 | 011CH | data packet 4 |
| 09 | 0120H | storage command 5 |
| 10 | 0124H | data packet 5 |
| 11 | 0128H | -empty- |
| ... | ... | ... |
| 32 | 017CH | -empty- |

Once these two additional queue objects are written to queue 44, the next write address specified by write pointer process 108 is 0128H. Note that "storage command 1", "data packet 1", "storage command 2", and "data packet 2" are shown in a struck-through font, indicating that these queue objects have already been read and processed by processor 12.

Since the queues created by queue management process 24 are typically circular buffers, the next write address is continuously incremented until it reaches the address of the last word of the queue (i.e., 017CH). Once this word is written, the next write address is reset to the address of the first word of the queue (i.e., 0100H). Accordingly, the next queue object received by the queue will be written to this address, assuming that the first word of the queue has already been read and processed by host processor 12.

Queue management process 24 includes a queue status monitoring process 110 for monitoring the status of each queue created and maintained by the queue management process 24. This status information, in the form of a queue status flag, is transmitted on flag bus 22 to the processor/application using the queue in question. This status flag, which is indicative of the operational condition of the queue, can indicate the following conditions: an empty queue condition; a nearly empty queue condition; a nearly full queue condition; and a full queue condition.

An empty queue condition status flag is generated whenever the content of the queue is empty. This occurs whenever system 10 is first started or the queue objects stored in the queue are all processed.

A nearly empty queue condition status flag is generated whenever the content of the queue is within a defined number of words from being empty. Typical values for this defined number of words are zero, one, two, four, eight, sixteen, thirty-two, and sixty-four words.

A nearly full queue condition status flag is generated whenever the content of the queue is within a defined number of words from being full. Typical values for this defined number of words are zero, one, two, four, eight, sixteen, thirty-two, and sixty-four words.

A full queue condition status flag is generated whenever the queue is full. This occurs whenever the application/processor assigned to the queue is incapable of reading or fails to read the queue objects from the queue for an extended period of time.

Queue status monitoring process 110 provides these status flags (and, therefore, provides updates concerning the operational condition of each queue) at defined intervals. These intervals are defined by the entry size of the queue. For example, if the entry size of a queue is four words, a status flag is generated for that queue each time a total of four words is written to that queue. Accordingly, if a status flag for a queue is transmitted and then two words are written to the queue, a second status flag will not be transmitted. However, if three more words are written to the queue in question, after the writing of the second of the three words, a status flag for that queue is generated and transmitted on flag bus 22.

Further, as it is important to determine the operational condition of the queue after queue objects are read from the queue, the queue status monitoring process also generates a status flag concerning each queue each time a defined number of words are read from the queue in question. Again, this defined number of words is specified by the entry size of the queue. For example, if the entry size for a particular queue is four words and two words are read from the queue, a status flag will not be generated for the queue. If then five more words are read from the queue, after the reading of the second of the five words, a status flag will be generated for that queue.

Typically, the word read count is separate from and does not impact the word written count. For example, if a queue has a four word entry size, and two words are read from the queue and then three words are written to the queue, a status flag will not typically be generated for the queue. Accordingly, a status flag will not be generated for this queue until either: two more words are read from the queue (for a total of four words read); or one more word is written to the queue (for a total of four words written).

Figure 3:
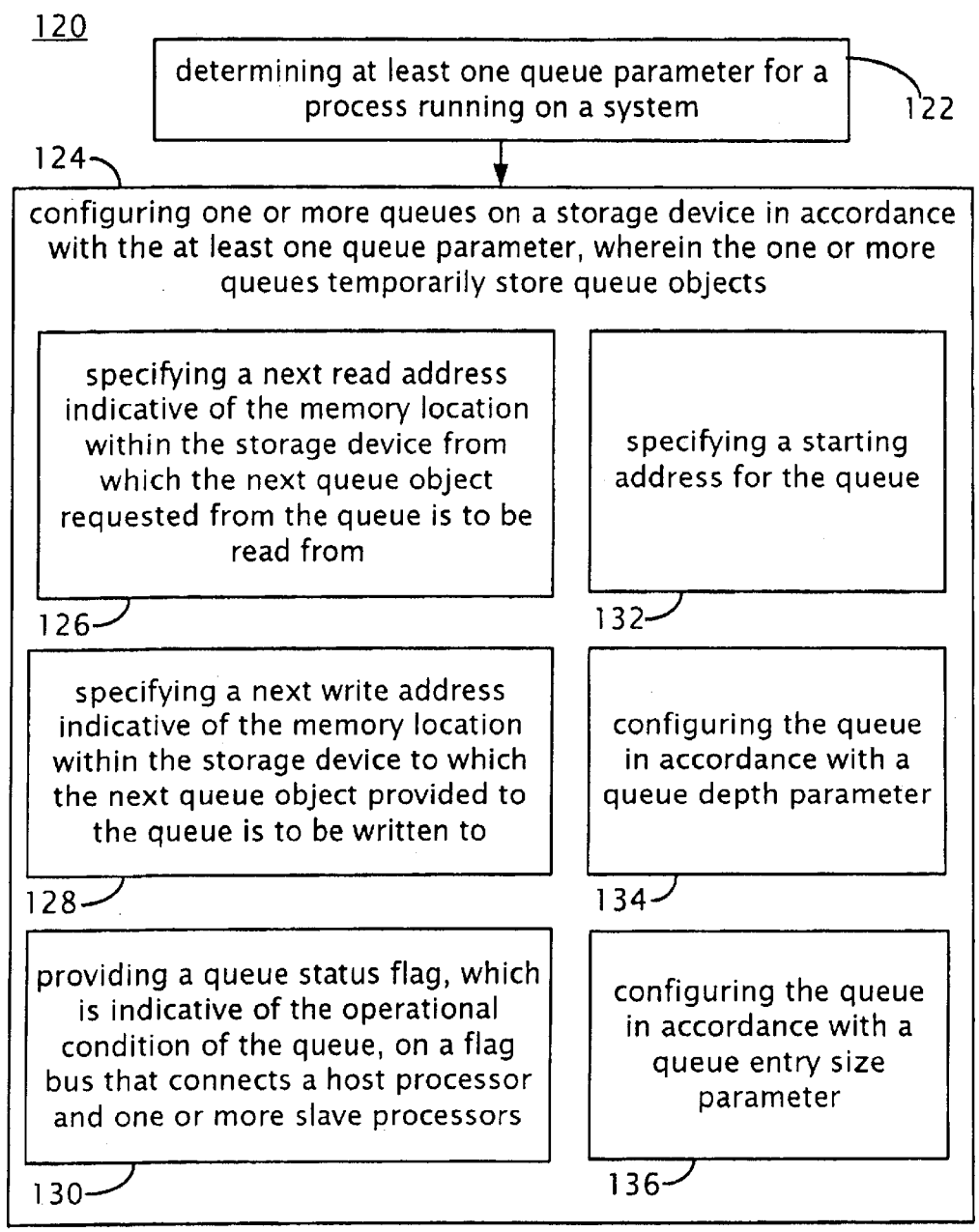
FIG. 3 shows a queue management method.

Referring to FIG. 3, there is shown a queue management method 120. At least one queue parameter is determined 122 for a process running on a system. One or more queues are configured 124 on a storage device in accordance with the queue parameter(s) determined. These queues temporarily store queue objects.

Configuring 124 the queues includes specifying 126 a next read address indicative of the memory location within the storage device from which the next queue object requested from the queue is to be read from. Configuring 124 the queues includes specifying 128 a next write address indicative of the memory location within the storage device to which the next queue object provided to the queue is to be written to.

Configuring 124 the queues also includes providing 130 a queue status flag. This queue status flag, which is indicative of the operational condition of the queue, is transmitted on a flag bus that connects a host processor and one or more slave processors. Configuring 124 the queues includes specifying 132 a starting address for the queue.

The queue parameters determined include a queue depth parameter and a queue entry size parameter. Configuring 124 the queues includes configuring 134 the queue in accordance with the queue depth parameter and configuring 136 the queue in accordance with the queue entry size parameter.

Figure 4:
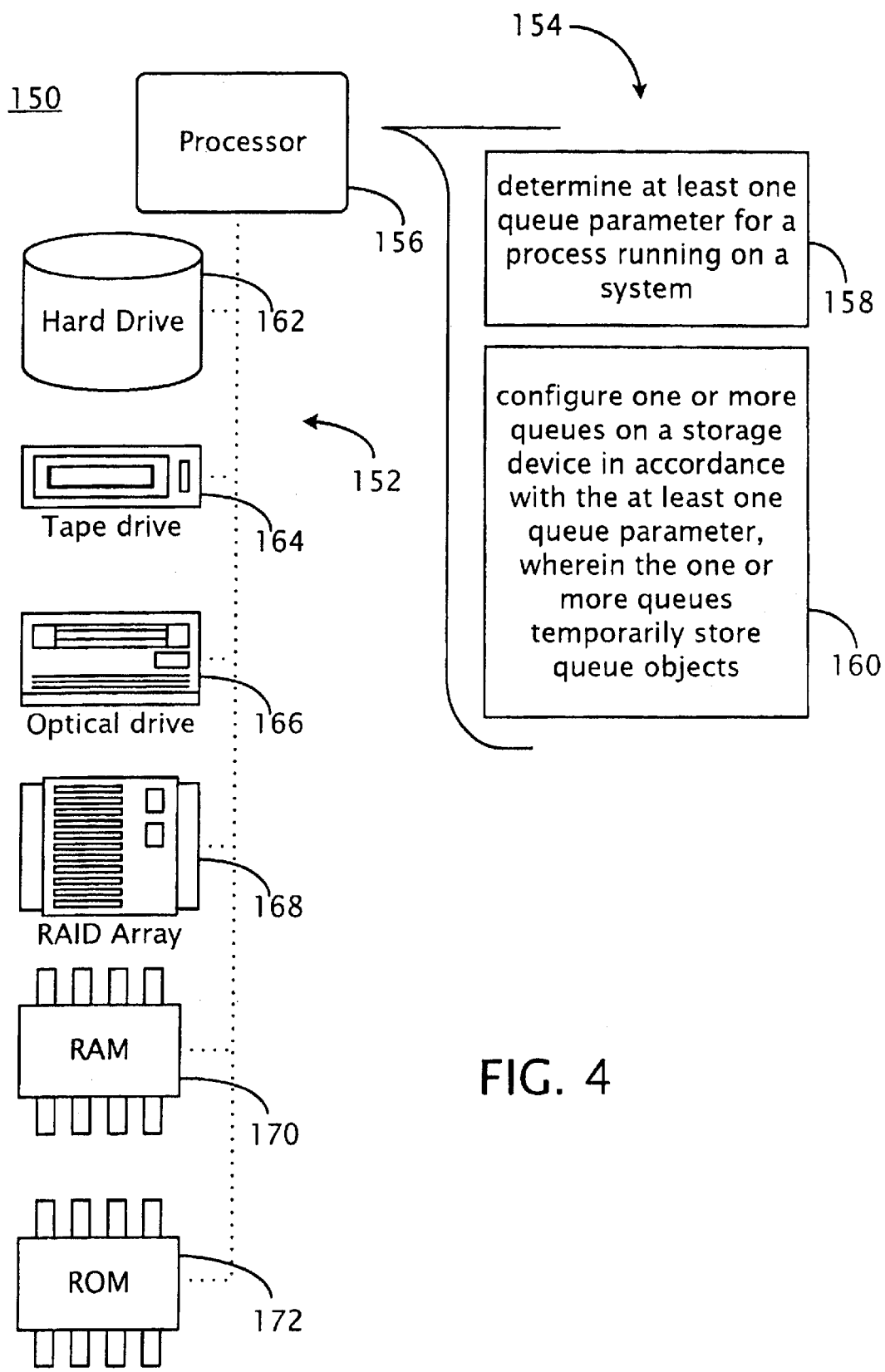
FIG. 4 shows another queue management process.

Referring to FIG. 4, there is shown a computer program product 150 that resides on a computer system. Computer program product 150 includes a computer readable medium 152 that stores instructions 154 that, when executed by a processor 156, cause that processor 156 to determine 158 at least one queue parameter for a process running on a system. Computer program product 150 configures 160 one or more queues on a storage device in accordance with the queue parameter(s). These queues temporarily store queue objects.

Typical embodiments of computer readable medium 152 are: hard disk drive 162, tape drive 164; optical drive 166; RAID array 168; random access memory 170; and read only memory 172.

Alternative Embodiments:

Referring to FIGS. 1 and 2, while three slave processors 14, 16 and 18 are shown, another number of slave processors can be used in accordance with the design and application requirements of system 10.

While data packets and commands (i.e., queue objects) are commonly described above as being transferred from one of the slave processors to the host processor, these queue objects can also be transferred from host processor to slave processor, or between slave processors.

While storage device 50 is described as being an eight kilobyte SRAM storage device, the storage device 50 can be as large or as small as required to accommodate the queues that need to be created. Further, the type of storage device can be tailored in accordance with the performance requirements of system 10.

While the queue objects are described above as being stored within the queue itself, these queue objects could actually be stored in system memory 54 and the queue could function as a pointer that locates these queue objects within system memory.

While queue management process 24 is shown to create six queues 38, 40, 42, 44, 46 and 48 for five applications 28, 30, 32, 34 and 36 running on system 10, the total number of queues, the total number of applications, and the number of queues per application/processor will vary depending on the design requirements of system 10.

While a word is described above as consisting of four bytes, other byte lengths may be used in other systems, as it is known, for example, that sixteen bit systems use two-byte words, sixty-four bit systems use eight-byte words, etc.

While the system commands and the data packets are shown as being separate words/queue objects, each word typically includes four bytes and it would be possible for the first two bytes of a word to be the command and the second two bytes of the word to be the data packet, for example. Other arrangements are also possible.

While the host processor 12, slave processors 14, 16 and 18, and queue management controller 26 are shown as discrete components, they may be created on a single silicon wafer and incorporated into a single integrated circuit chip.

While the word read count is described above as being kept separate from the word written count (for purposes of generating queue status flags), it is possible to configure the queues to generate a status flag each time the combination of words written to a queue and words read from the same queue equals the entry size of the queue. Other arrangements are also possible.

Other embodiments are within the scope of the following claims.

What is claimed is:

1. A method comprising
one processor determining at least one queue parameter for a process running on a second processor;
configuring one or more queues on a storage device in accordance with the at least one queue parameter; and
carrying, on a bus between the processors, a flag indicating an operational condition of one of the queues used by the process.

2. The method of claim 1 wherein said configuring one or more queues includes specifying a next read address indicative of a memory location within the storage device from which the next queue object requested from the queue is to be read.

3. The method of claim 1 wherein said configuring one or more queues includes specifying a next write address indicative of a memory location within the storage device to which the next queue object provided to the queue is to be written.

4. The method of claim 1 wherein said configuring one or more queues includes providing a queue status flag that is indicative of an operational condition of one of the queues.

5. The method of claim 1 wherein said configuring one or more queues includes specifying a starting address for the queue.

6. The method of claim 1 wherein the at least one queue parameter includes a queue depth parameter and said configuring one or more queues includes configuring the queue in accordance with the queue depth parameter.

7. The method of claim 1 wherein the at least one queue parameter includes a queue entry size parameter and said configuring one or more queues includes configuring the queue in accordance with the queue entry size parameter.

8. A system comprising:
a host processor to determine at least one queue parameter for a process running on said system;
a storage device;
a queue management process to configure one or more queues on said storage device in accordance with said at least one queue parameter; and
a flag bus for connecting said host processor to at least one slave processor.

9. The system of claim 8 wherein said queue management process includes a read pointer process for each queue configured by said queue management process, wherein said read pointer process specifies a next read address indicative of a memory location within said storage device from which the next queue object requested from said queue is to be read.

10. The system of claim 8 wherein said queue management process includes a write pointer process for each queue configured by said queue management process, wherein said write pointer process specifies a next write address indicative of a memory location within said storage device to which the next queue object provided to said queue is to be written.

11. The system of claim 8 further comprising the at least one slave processor.

12. The system of claim 11 wherein said slave processor comprises a programmable state machine.

13. The system of claim 11 further comprising a data bus for connecting said host and slave processors, wherein said data bus transfers queue objects between said processors.

14. The system of claim 11 further comprising a flag bus for connecting said host and slave processors.

15. The system of claim 14 wherein said queue management process includes a queue status monitoring process for each queue configured by said queue management process, wherein said queue status monitoring process provides a queue status flag, which is indicative of an operational condition of said queue, on said flag bus.

16. The system of claim 15 wherein said queue status flag indicates at least one of:
an underflow queue condition;
an empty queue condition;
a nearly empty queue condition;
a nearly full queue condition;
a full queue condition; and
an overflow queue condition.

17. The system of claim 8 wherein said queue management process includes a queue base address process for each queue configured by said queue management process, wherein said queue base address process specifies a starting address for said queue.

18. The system of claim 8 wherein said at least one queue parameter includes a queue depth parameter and said queue management process includes a queue depth specification process for each queue configured by said queue management process, wherein said queue depth specification process configures said queue in accordance with said queue depth parameter.

19. The system of claim 8 wherein said at least one queue parameter includes a queue entry size parameter and said queue management process includes a queue entry size specification process for each queue configured by said queue management process, wherein said queue entry size specification process configures said queue in accordance with said queue entry size parameter.

20. The system of claim 8 wherein said storage device comprises an SRAM storage device.

21. The system of claim 8 wherein said one or more queues temporarily store queue objects and said queue objects include at least one of:

a data packet; and a system command.

22. A computer program product residing on a computer readable medium having instructions stored thereon that, when executed by a computer system, causes the computer system to:

use one processor to determine at least one queue parameter for a process running on a second processor;

configure one or more queues on a storage device in accordance with the at least one queue parameter; and carry, on a bus between the processors, a flag indicating an operational condition of one of the queues used by the process.

23. The computer program product of claim 22 wherein said computer readable medium comprises a read-only memory.

24. The computer program product of claim 22 wherein said computer readable medium comprises a hard disk drive.

25. An apparatus for configuring one or more queues, comprising:

a queue base address process for specifying a starting address for each of said one or more queues required by a process running on a system; and a queue depth specification process, working in conjunction with the queue base address process, for configuring each said queue in accordance with a queue depth parameter provided by said process running on said system.

26. The apparatus of claim 25 further comprising:

a queue entry size specification process for configuring each said queue in accordance with a queue entry size parameter provided by said process running on said system.

27. An apparatus for configuring one or more queues, comprising:

a queue base address process for specifying a starting address for each of said one or more queues required by a process running on a system; and a queue entry size specification process, working in conjunction with the queue base address process, for configuring each said queue in accordance with a queue entry size parameter provided by said process running on said system.

28. The apparatus of claim 27 further comprising:

a queue depth specification process for configuring each said queue in accordance with a queue depth parameter provided by said process running on said system.

29. An apparatus for configuring one or more queues, comprising:

a queue base address process for specifying a starting address for each of said one or more queues required by a process running on a system; and a queue status monitoring process, working in conjunction with the queue base address process, for providing, for each said queue, a queue status flag that is indicative of the operational condition of said queue.

30. The apparatus of claim 29 wherein said queue status flag is configured to indicate at least one of:

an underflow queue condition;

an empty queue condition;

a nearly empty queue condition;

a nearly full queue condition;

a full queue condition; and an overflow queue condition.

31. Circuitry comprising:

a first processor to determine at least one queue parameter for a process to be run on a second processor:

a storage device; and a queue management process to configure one or more queues on said storage device in accordance with said at least one queue parameter; and a bus, connecting the processors, to carry a flag indicating an operational condition of one of the queues.

32. The circuitry of claim 31 wherein maid queue management process includes a read pointer process for each queue configured by said queue management process, wherein said read pointer process is configured to specify a next read address indicative of a memory location within said storage device from which the next queue object requested from said queue is to be read.

33. The circuitry of claim 31 wherein said queue management process includes a write pointer process for each queue configured by said queue management process, wherein said write pointer process is configured to specify a next write address indicative of a memory location within said storage device to which the next queue object provided to said queue is to be written.

34. The circuitry of claim 31 in which the first and second processors comprise a host processor and a slave processor.

35. The circuitry of claim 34 further comprising a data bus for connecting said host and slave processors, wherein said data bus transfers queue objects between said processors.

36. The circuitry of claim 34 wherein said queue management process includes a queue status monitoring process for each queue configured by said queue management process, wherein said queue status monitoring process provides a queue status flag, which is indicative of an operational condition of said queue, on said flag bus.

37. The circuitry of claim 31 wherein said queue management process includes a queue base address process for each queue configured by said queue management process, wherein said queue base address process specifies a starting address for said queue.

38. The circuitry of claim 31 wherein said at least one queue parameter includes a queue depth parameter and said queue management process includes a queue depth specification process for each queue configured by said queue management process, wherein said queue depth specification process configures said queue in accordance with said queue depth parameter.

39. The circuitry of claim 31 wherein said at least one queue parameter includes a queue entry size parameter and said queue management process includes a queue entry size specification process for each queue configured by said queue management process, wherein said queue entry size specification process configures said queue in accordance with said queue entry size parameter.

* * * * *